(12) United States Patent
Graham

(10) Patent No.: US 11,448,191 B1
(45) Date of Patent: Sep. 20, 2022

(54) ROOF MOUNTED WIND ENERGY COLLECTION DEVICE

(71) Applicant: Gary Graham, Bellingham, WA (US)

(72) Inventor: Gary Graham, Bellingham, WA (US)

(73) Assignee: Contemporary Design Company, Bellingham, WA (US)

( * ) Notice: Subject to any disclaimer, the term of this patent is extended or adjusted under 35 U.S.C. 154(b) by 11 days.

(21) Appl. No.: 17/152,662

(22) Filed: Jan. 19, 2021

Related U.S. Application Data

(63) Continuation-in-part of application No. 16/997,818, filed on Aug. 19, 2020, now abandoned.

(60) Provisional application No. 62/888,915, filed on Aug. 19, 2019.

(51) Int. Cl.
*F03D 9/45* (2016.01)
*F03D 9/25* (2016.01)
*H02K 7/18* (2006.01)

(52) U.S. Cl.
CPC ............. *F03D 9/45* (2016.05); *F03D 9/25* (2016.05); *H02K 7/183* (2013.01); *F05B 2220/706* (2013.01); *F05B 2240/9112* (2013.01)

(58) Field of Classification Search
CPC ... F03D 9/45; F03D 9/25; H02K 7/183; F05B 2220/706; F05B 2240/9112
See application file for complete search history.

(56) References Cited

U.S. PATENT DOCUMENTS

| | | | |
|---|---|---|---|
| 4,877,374 A | 10/1989 | Burkett | |
| 7,445,420 B2 | 11/2008 | Yoshida | |
| 2010/0126086 A1 | 5/2010 | Paggi | |
| 2011/0250069 A1* | 10/2011 | Quintal | F03D 3/064 416/111 |
| 2011/0318167 A1* | 12/2011 | Miller | F03D 3/0427 415/121.2 |
| 2012/0070293 A1 | 3/2012 | Cwiertnia et al. | |
| 2013/0028722 A1* | 1/2013 | Blackburn | F03D 3/002 415/208.1 |

(Continued)

OTHER PUBLICATIONS

GTM, "South Korean Firm Touts Novel Vertical Axis Wind Turbine Tower Concept", https://www.greentechmedia.com/articles/read/south-korean-firm-touts-novel-vertical-axis-wind-turbine-tower-concept, accessed Nov. 16, 2020, 4 pages.

(Continued)

*Primary Examiner* — Joseph Ortega
(74) *Attorney, Agent, or Firm* — Dwayne Rogge

(57) ABSTRACT

A wind energy collection device configured to be mounted to the roof of a structure, the device optionally comprising: a support frame to be fixed to the roof of a building; a wind turbine impeller mounted to the support frame, the impeller supported by a turbine shaft oriented in a fixed horizontal and vertical position relative to the frame. The impeller optionally coupled to a generator to convert rotational movement of the impeller to power that can be stored and/or transmitted. The device may also comprise at least one directional panel configured to direct the wind to at least one impeller vane of the impeller such that the impeller rotates in a rotational direction due to force exerted by the wind blowing in a first direction; and the directional panel is repositionable so as to direct the wind blowing in a second direction opposed to the first direction such that the impeller rotates in the rotational direction.

7 Claims, 8 Drawing Sheets

(56) References Cited

U.S. PATENT DOCUMENTS

2013/0119661 A1    5/2013   Pringle et al.
2014/0167417 A1    6/2014   Tang
2015/0275865 A1   10/2015   Marquardt
2016/0290315 A1   10/2016   Borle

OTHER PUBLICATIONS

The Power Collective, "RidgeBlade, The Ridge Mounted Wind Turbine", http://thepowercollective.ca, accessed Nov. 16, 2020, 4 pages.

* cited by examiner

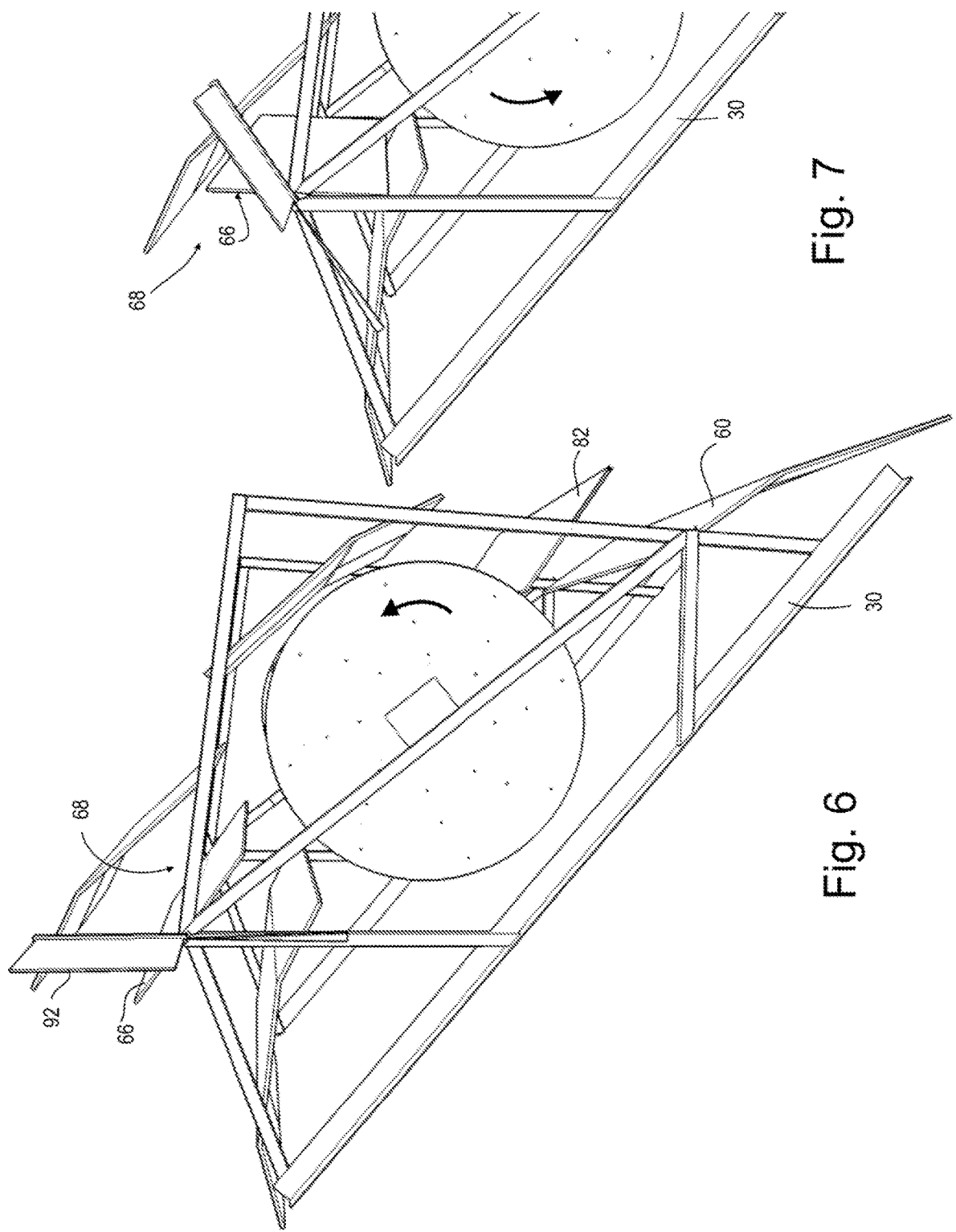

ROOF MOUNTED WIND ENERGY COLLECTION DEVICE

RELATED APPLICATIONS

This application is a Continuation-In-Part of U.S. patent application Ser. No. 16/997,818 filed on Aug. 19, 2020, which claims priority benefit of U.S. Provisional Application Ser. No. 62/888,915 filed on Aug. 19, 2019, each incorporated herein by reference.

BACKGROUND OF THE DISCLOSURE

Field of the Disclosure

This disclosure relates to the field of wind powered energy devices. In one example configured with an axle upon which an impeller rotates. The rotating axle drives a generator for power conversion or other use. The wind collection apparatus of one example comprising at least one positionable directional panel mounted to the frame of the device and configured to be positioned to account for changing wind direction.

BRIEF SUMMARY OF THE DISCLOSURE

Disclosed herein is a roof mounted wind energy collection device comprising in one example: a support frame configured to be fixed to the roof of a building. The device in one example utilizing a wind turbine impeller mounted to the support frame, the impeller supported by an axle fixed relative to the frame. The impeller may be coupled to a generator configured to convert rotational movement of the impeller to power that can be stored and/or transmitted, such as electric, pneumatic, or hydraulic power.

The device disclosed herein may also comprise at least one directional panel configured to direct the wind (airflow) to at least one impeller vane of the impeller such that the impeller rotates in a rotational direction due to force exerted by the wind blowing in a first direction; and the directional panel is repositionable so as to direct the wind blowing in a second direction opposed to the first direction such that the impeller rotates in the rotational direction.

BRIEF DESCRIPTION OF THE SEVERAL VIEWS OF THE DRAWINGS

FIG. 6 is a side view of the example shown in FIG. 4 with a gate in an open position.

FIG. 7 is a side view of the example shown in FIG. 4 with a gate in a closed position.

DETAILED DESCRIPTION OF THE DISCLOSURE

Disclosed herein is a device configured to harness wind energy and use the environmental footprint of an existing structure. The device of one example is configured to be mounted to the roof of a structure, or a similar surface and harness wind energy. Where such wind direction may reverse direction over time, the apparatus may be configured with movable panels to change the flow of wind through the apparatus.

Such wind direction reversals are known in many regions and can often be predicted. For example, in many regions the predominant wind shifts direction 180° twice a year, seasonally or on other timelines. The predominant wind may blow East to West in the summer, and West to East in the winter. In another example, monsoon winds blow from the land to the water in colder seasons, and from the water to the land in warmer seasons. On a smaller scale, daily wind may shift due to thermal effects such as wind blowing from the land toward a water body in the morning and from the water to the land in the evening. Similar winds blow up a hillside in the warmer parts of a day and blow down a hillside at night as the land and air on the slope, especially at the bottom of the hillside heats and cools daily.

To harvest such wind energy, disclosed herein is a roof mounted wind energy collection device 20 configured to be mounted to the roof 22 of a building 24. A roof defined herein as the external upper surface of a house, barn, warehouse, building, or structure. The device 20 may be mounted to a hillside, overpass, pole building, or other building where directional winds are known to flow.

Figure 1:
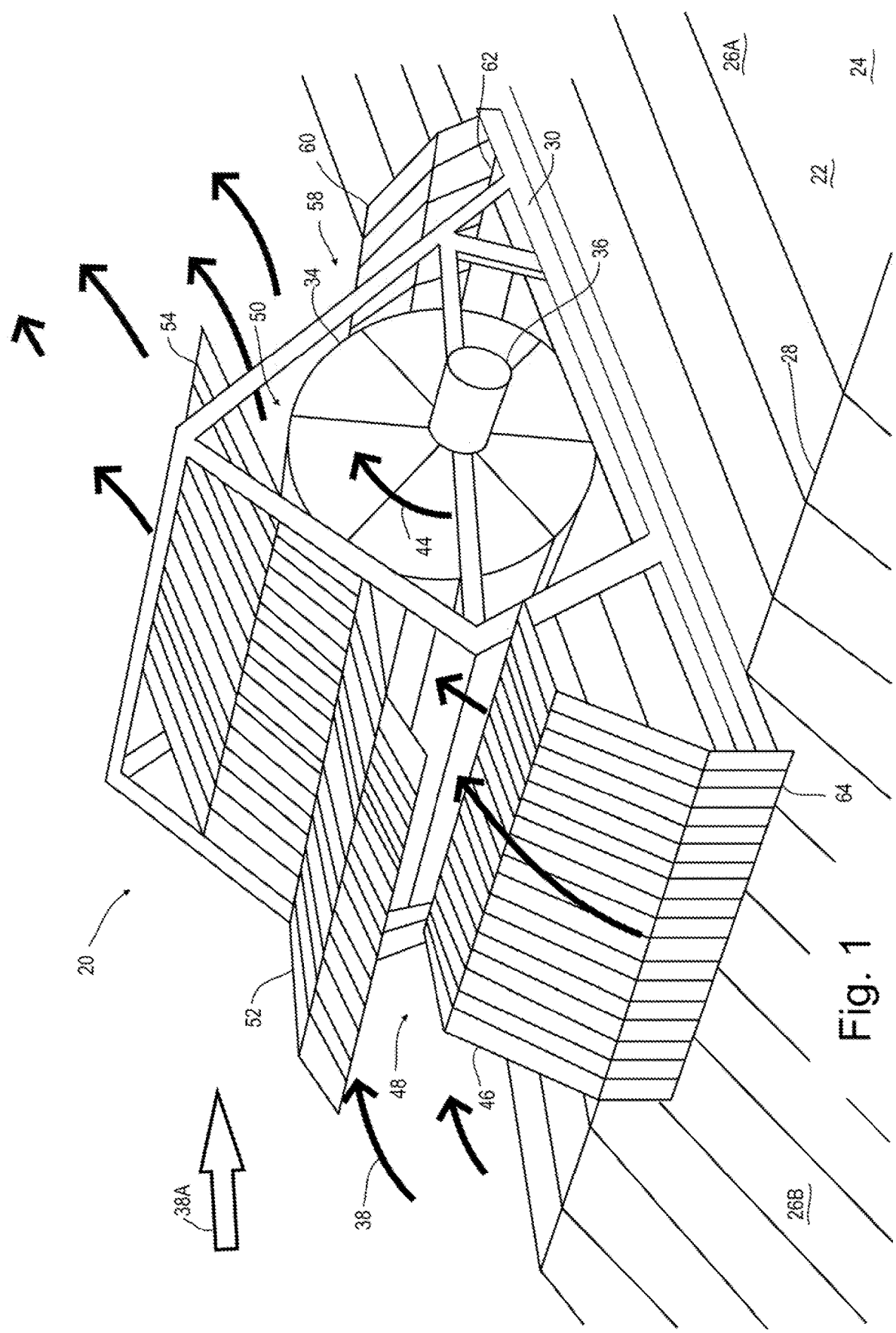
FIG. 1 is a perspective view of one example of the roof mounted wind energy collection device mounted to a roof surface.

Looking to FIG. 1 it can be seen that the roof 22 comprises a first roof surface 26A which may be level (being in a plane parallel to the plane of the horizon), angled, arcuate, or a combination thereof. The device 20 is mounted (fixed) to this roof surface 26A and thus does not require a new or separate environmental footprint whereas other windmills and similar wind energy conversion devices are too heavy and have too much lever arm (too tall) to be supported by an existing structure and thus require a ground footprint for stability. In many residential applications, the roof 22 comprises a first roof surface 26A at a first angle to the horizon and a second roof surface 26B at an angle to the first roof surface 26A with a second angle to the horizon. The merging of these roof surfaces 26A and 26B forming a roof ridge 28.

Figure 2:
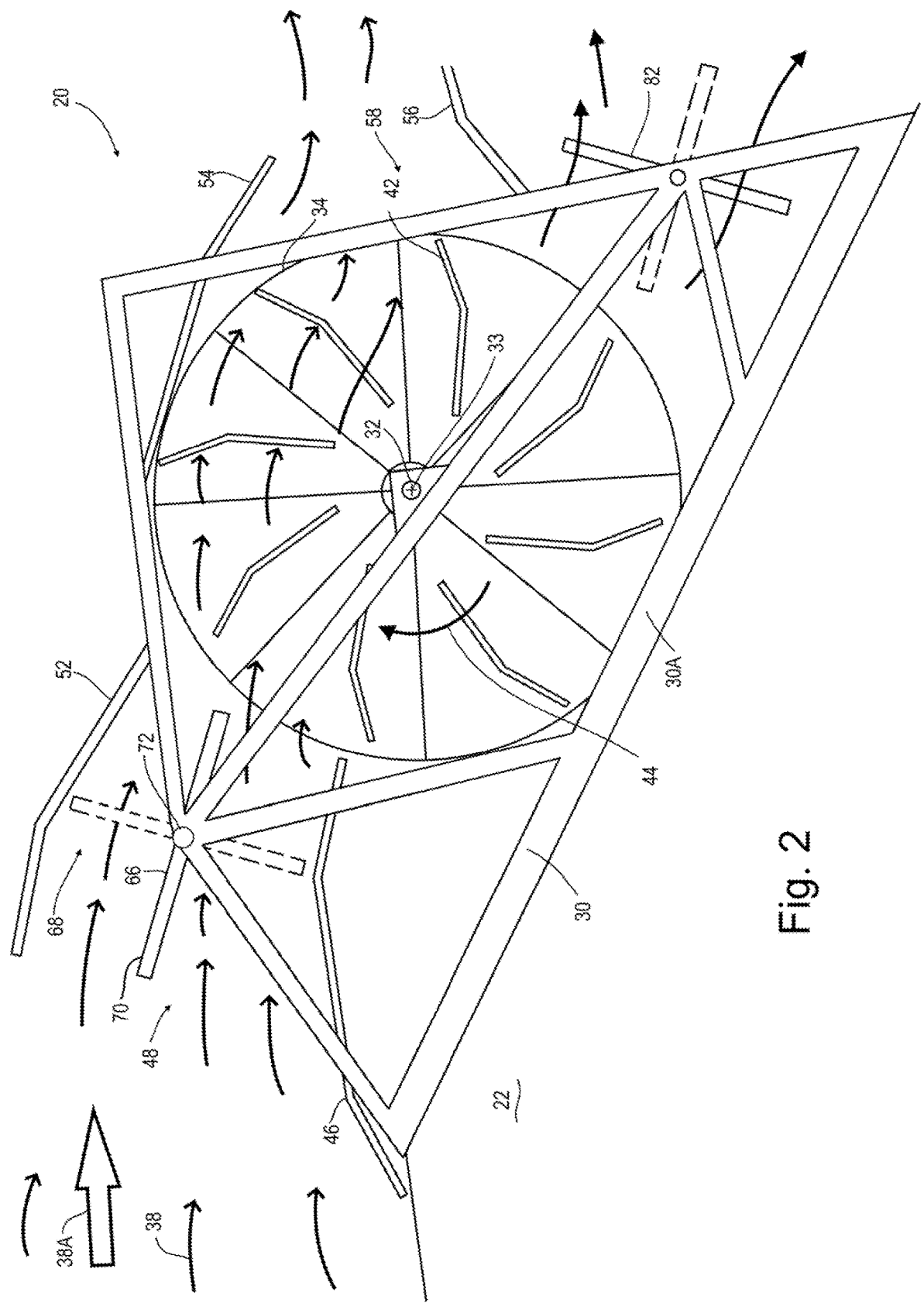
FIG. 2 is a side view of the example shown in FIG. 1 shown arranged for wind flow in a first direction.

In the example shown, the device 20 comprises a support frame 30 mounted to the roof surface 26A. In one example, the support frame 30 overlaps the roof surface 26B also. Components 30A of this frame 30 are mounted to the roof 20 to support a turbine shaft 32, bearings, or other pivot(s) and rotating components with a rotational axis 33 as shown in FIG. 2. An impeller 34 is coupled to the axle 32 to rotate about the axis of rotation 33. The axis of rotation 33 is shown substantially horizontal, parallel to the ridge 28 of the roof 22 but may be vertically oriented, parallel to the roof slope, orthogonal to the roof surface 26, or otherwise aligned relative to the surfaces 26 of the roof 22. In the example shown, the horizontal and vertical position of the shaft 32 is fixed relative to the roof 22, and the impeller rotates about the axis 33 of this shaft 32. While the impeller 34 of this example rotates about the axis 33, the horizontal and vertical position of the axle 32 does not change relative to the roof 22. In prior known wind turbines, the orientation of the blades (alignment of the axis of rotation) swivels about a horizontal axis in an assembly and such an assembly would normally swivel about a vertical axis so as to face the oncoming wind and so increase efficiency. In this example, the wind is directed by a series of directional panels and pivoting gates in different flow paths to ensure efficient operation.

In one example, the shaft 32 is mounted to the frame 30 and supports the impeller 34. The impeller 34 is configured to rotate about the axis 33 when the wind 38 exerts sufficient force upon the impeller 34 to overcome friction, electromagnetic induction, and other rotation-resistant forces.

To convert the kinetic energy of the rotating impeller 34/shaft 32 to a more transportable form, such as electricity the impeller 34 in one example is connected to a generator 36 such that rotation of the impeller 34 rotates components of the generator 36 and thus converts the kinetic energy of the wind into other forms, such as electric, mechanical, pneumatic, or hydraulic potential energy which can be stored and/or transmitted to other location(s) where power is needed.

To improve efficiency, the generator 36 may be direct driven from the impeller 34 via the axle 32 as shown, or connected via gears, chains, shafts, pneumatic or hydraulic conduits or other methods to achieve power conversion in the generator 36.

As stated earlier, predominant winds often blow in a cyclic reversing direction. Where the device 20 is mounted to a building 24 or other landform or structure, and where the predominant wind direction is known to blow in a first direction 38A in one cycle and in an opposing direction 38B in another cycle, it may not be necessary to pivot the frame 30, axle 32, impeller 34 or other components of a wind turbine 40 about a vertical axis as is commonly done in the art to maintain the same rotational direction 44 of the impeller 34. Such rotation about a vertical axis is common in wind energy devices such as disclosed in U.S. Pat. No. 4,877,374A or U.S. Pat. No. 7,445,420.

In our examples shown here, the device 20 may be fitted with directional panels, pivoting gates, or configured to direct the wind blowing in a first direction 38A or in an opposing second direction 38B against wind engaging surfaces (impeller vanes) 42 in such a way that the direction of rotation 44 of the impeller 34 remains constant or within an efficient range regardless of the wind 38 (wind direction 38A/38B). Some of these directional panels can be moved, pivoted, or otherwise adjusted to direct the wind flow 38 as desired to the impeller 34.

Figure 8:
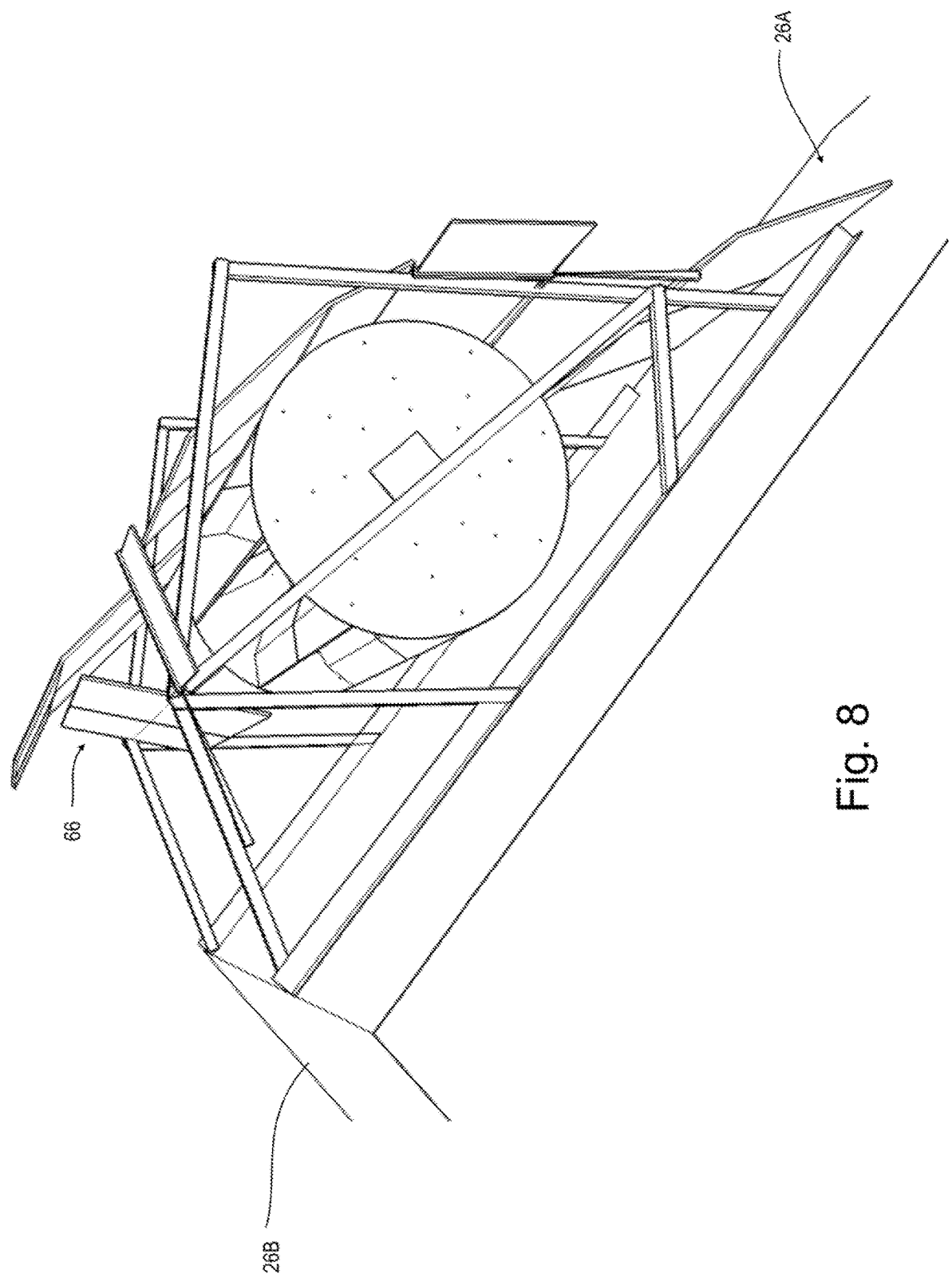
FIG. 8 is a side view of the example shown in FIG. 4 with a gate in a closed position.

In one example shown in FIG. 2, the device 20 comprises an optional first directional panel 46 on a first end 48 of the device 20. In this figure, the first directional panel 46 is shown in a first position. Wind 38A encountering this panel 46 is deflected upwards toward the upper region 50 of the impeller 34 towards the impeller vanes 42. In other examples, for example as shown in FIG. 8, the roof surface 26B acts as a deflector, deflecting wind to the impeller vanes 42 of the impeller 34.

Thus, the wind 38 pushes against the impeller vanes 42 to rotate the impeller 34 about the axle 32 in the rotational direction 44, which is shown as clockwise in FIG. 2. This first directional panel 46 may be mounted to the frame 30 at a pivot 84 and held in place by friction, struts, cables or ropes, and other structures.

In the example shown, an optional second directional panel 52 is attached to the frame 30. This panel 52 may be adjustably or fixedly positioned adjacent the first directional panel 46. This second panel 52 cooperates with the first panel 46 or roof surface 26b so as to direct and funnel wind to the upper region 50 of the impeller 34. This funneling may form a Venturi effect, increasing efficiency of the apparatus 20. Such a Venturi effect is the reduction in fluid pressure that results when a fluid (air in this example) flows through a constricted section. In fluid dynamics, an incompressible fluid's velocity must increase as it passes through a constriction in accord with the principle of mass continuity, while its static pressure must decrease in accord with the principle of conservation of mechanical energy (Bernoulli's principle). Thus, any gain in kinetic energy a fluid may attain by its increased velocity through a constriction is balanced by a drop in pressure. While air is compressible, the same effect can be applied. As the wind exerts force against the impeller vanes 42 of the impeller 34, the impeller 34 rotates in direction 44 about the axle 32 with more efficiency than without the second directional panel 52.

As previously mentioned, this second directional panel 52 may be mounted to the frame 30 at a pivot 86 and held in place by friction, struts, cables, ropes, and/or other structures.

To further increase efficiency, an optional third directional panel 54 is shown on the second side 56 of the device 20. This third panel 54 is rotatably or fixedly attached to the frame 30 and cooperates with the panels 46 and 52 to direct wind most efficiently against the impeller vanes 42 of the impeller 34. In one example, this third panel 54 substantially prohibits the wind from exiting the impeller until the wind approaches a first opening 58 between the directional panel 54 and a fourth directional panel 60. This combination provides a tunnel effect adjacent the impeller 34, where the wind exerts force more efficiently against the impeller vanes 42 of the impeller 34.

Figure 3:
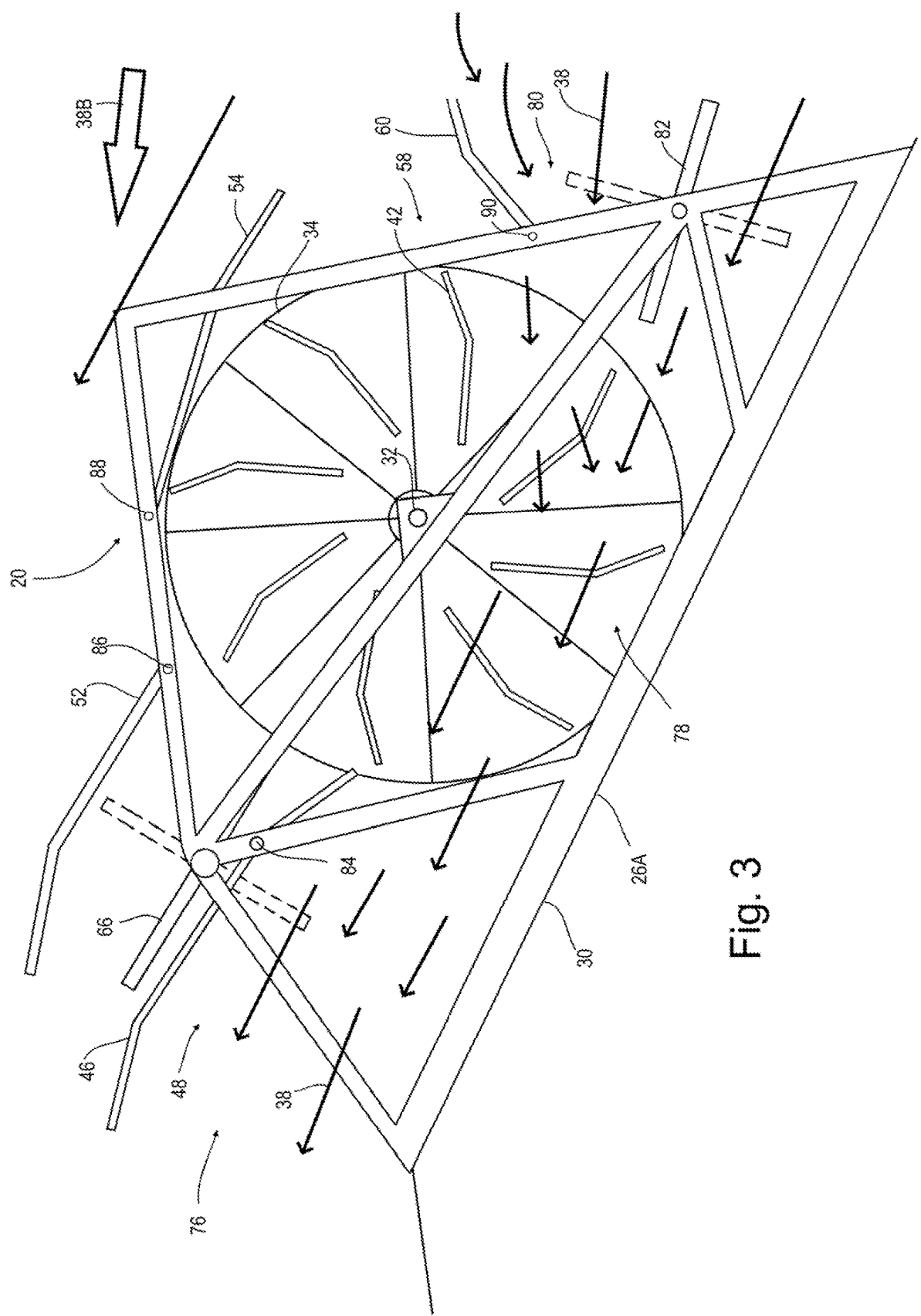
FIG. 3 is a side view of the example shown in FIG. 1 shown arranged for wind flow in a second wind direction opposite the first wind direction.

This third directional panel 54 may be mounted to the frame 30 at a pivot 88 as shown in FIG. 3 and held in place by friction, struts, cables or ropes, or other structures and combinations thereof. Likewise, the fourth directional panel 60 may be mounted to the frame 30 at a pivot 90 and held in place by friction, struts, cables or ropes, or other structures and combinations thereof.

Each of these directional panels 46, 52, 54, 60 may be rigid overall, capable of supporting their own weight without substantial bending or flexing in normal use.

In FIG. 1 the device 20 is arranged where a lower edge 62 of the panel 60 and a lower edge 64 of the panel 46 are adjacent or in contact with the roof 22 so as to limit the airflow between the panels 60/64 and the roof 22. The roof 22 may form one or more surfaces of the device 20 as shown in FIG. 8 and may be used in cooperation with the moving and/or stationary directional panels to direct the airflow 38 as desired. In addition, the frame 30 may comprise air barrier side panels (not shown) to limit airflow laterally past the frame 30 and thus enhance a tunneling effect of the directional panels 46, 52, 54, 60.

Also shown is a pivoting or rotating gate 66 configured to control (vary) the area of a second opening 68 opposite the first opening 58. In this example, the gate 66 comprises a panel 70 connected to the frame 30 at a pivot 72. This structure allowing rotational positioning of the gate 66 relative to the frame 30 and adjusting the volume/pressure/speed of the wind 38 as needed to maintain efficient rotational speed of the impeller 34. In FIG. 2 and in FIG. 4 the gate 66 is shown in a nearly fully open position as a solid line. The gate 66 is also shown in a nearly closed position as a broken (dashed) line.

Figure 4:
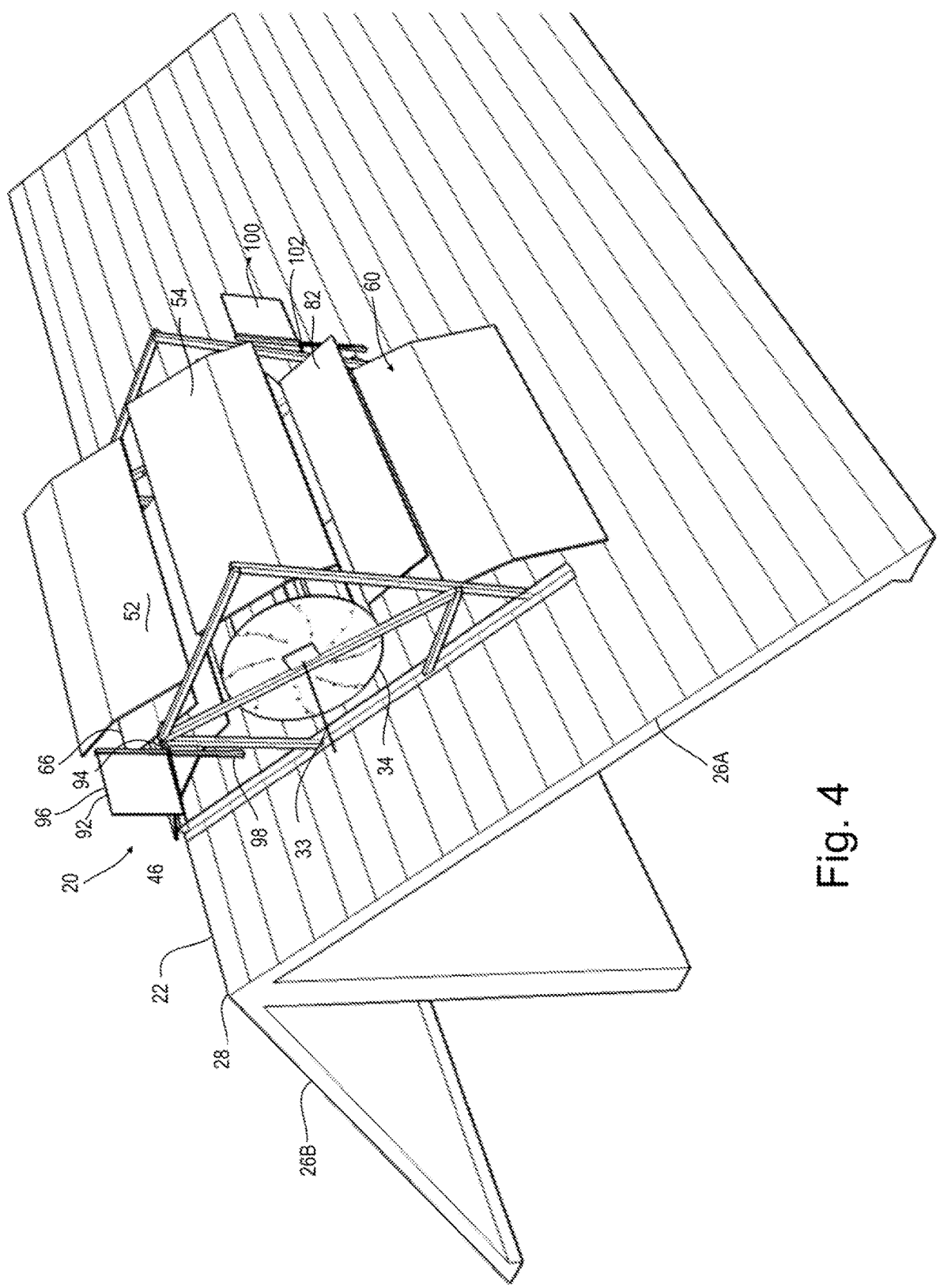
FIG. 4 in a perspective view of another example of the roof mounted wind energy collection device mounted to a roof surface.
Figure 5:
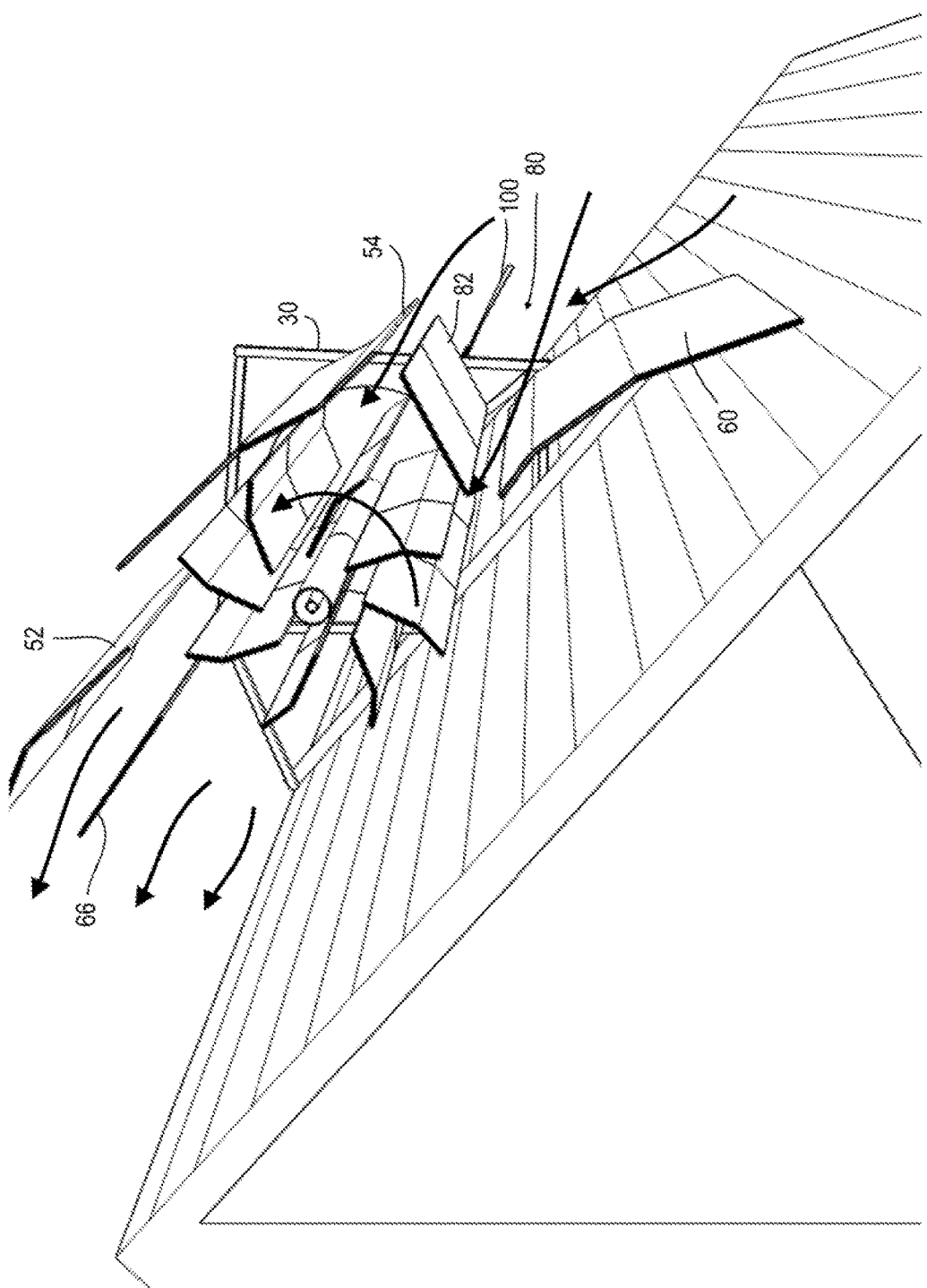
FIG. 5 is a side sectional view of the example shown in FIG. 4.

In FIG. 4-6 the gate 66 is shown in an open position to maximize airflow through the opening 48 to the impeller 34. By controlling this airflow, the apparatus 20 is configured to keep the rotational speed of the generator inside an efficient range. When the force of the wind 38 causes the generator to exceed an efficient speed range, it may be desired to reduce the area of the opening 68, thus reducing airflow and maintaining the rotation of the generator in an efficient range. In one example, this may be accomplished by rotating the gate 66 from an open position to a partially closed position. FIG. 7 for example shows this gate 66 rotated to a more closed position. This closed position will reduce airflow through the opening 68 and reduce the rotational speed of the generator 36. This closing of the gate 66 may be accomplished in several ways, such as a stepper motor, solenoid, pneumatic or hydraulic actuator, or equivalent device connected between the frame 30 and the gate 66. In one specific example, shown in FIG. 6, a pressure vane 92 is provided and connected through a shaft 94 or other structure to the gate 66.

In the example shown in FIG. 4-9, the pressure vane 92 comprises a flag portion 96 having a large surface area and configured to be blown against by the wind 38a. As wind 38a presses against the flag portion 96, the pressure vane 92 rotates about the shaft 94. This rotation in turn rotates the gate 66 to partially obstruct the opening 68. In one example, as shown in FIG. 8, the opening 68 is significantly blocked and the wind 38a significantly obstructed such that even during times of high wind speed or pressure, the generator 36 will maintain an efficient rotational speed range.

To return the gate 66 to the open position shown in FIG. 4 or 5, the vane 2 comprises a spring, actuator, or counterweight 98 configured to bias the gate 66 toward the open position shown in FIGS. 4 and 5. In this example, the counterweight 98 is fixed to a pole extending from the flag 96, past the shaft 94, to the counterweight 98. Thus, the weight of the counterweight will bias the pole downward, biasing the gate 66 toward the open position. The mass of the counterweight 98 and the distance of the counterweight along the pole from the shaft 94 can be set and adjusted to keep the generator 36 in an efficient rotational speed range.

FIG. 3 shows the device 20 arranged for the wind 38 to flow in direction 38B, rather than the opposing direction 38A shown in FIG. 2. Several causes for this wind direction change have been described above such as time of day, season of the year, etc. as described above.

Prior art wind turbines generally rotate the turbine such that the blades face the oncoming wind or use convex/concave cups. The cups-style wind turbines sacrifice wind drag as the convex surface of the cup turns into and faces the oncoming wind. At the same time, the concave surface of rotationally opposed cups facing the oncoming wind encounter more wind pressure, and thus the device rotates, albeit with power losses due to the sacrificial drag component. The device disclosed herein utilizes directional panels 46, 52, 54, 56 as well as gates 66, and 74 used in various combinations and positions to achieve the desired wind flow against and past the impeller 34 without such sacrificial drag.

Looking to FIG. 3 the directional panel 46 is repositioned to form an exit opening 76 on the first end 48 of the device 20 through which air flows when the airflow 38 exits the device 20 in this panel orientation.

In this panel orientation, the oncoming wind 38B is directed by the directional panel 60 and via the roof surface 26A through an entrance opening 80 to the lower region 78 of the impeller 34. The wind 38 then exerts force on the impeller vanes 42 to rotate the impeller 34 in the same direction 44 as in the configuration shown in FIG. 2 and exits via the exit opening 76.

A second gate 82, similar in function to the first gate 66 may be positioned at the opening 80 to control airflow/volume/pressure of the airflow 38 through the opening 80. This gate 82 as well as the previously described gate 66 may be connected to the frame 30 so as to rotate, slide, or move along the frame 30 and thus adjust the opening 80 as desired.

In FIG. 4, 6 the gate 82 is shown in an open position to maximize airflow to the impeller 34 as the air flows in the direction 38b. By controlling this airflow, it is possible to keep the rotational speed of the generator within an efficient range. When the force of the wind 38 causes the generator to exceed an efficient speed range, it may be desired to reduce the area of the opening 80, thus reducing airflow and maintaining the rotation of the generator in an efficient range. In one example, this may be accomplished by rotating the gate 82 from an open position as shown in FIG. 4 to a partially closed position as shown in FIG. 5. This closed position will reduce airflow through the opening 80 and reduce the rotational speed of the generator 36. This closing of the gate 82 may be accomplished in several ways, such as a stepper motor, solenoid, pneumatic or hydraulic actuator, or equivalent device connected between the frame 30 and the gate 82. In one specific example, shown in FIG. 9, a pressure vane 100 is provided and connected through a shaft 102 or other structure to the gate 82.

Figure 9:
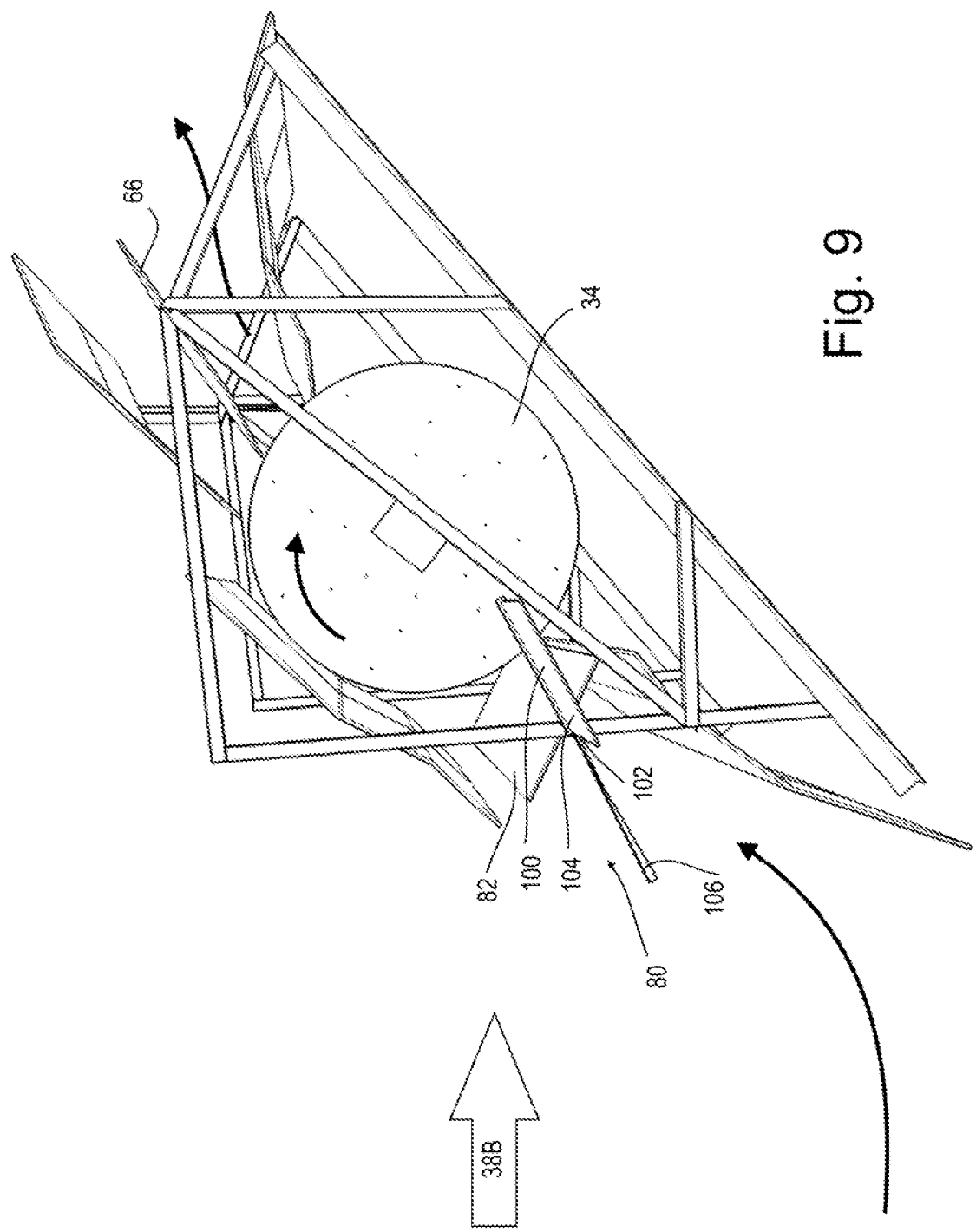
FIG. 9 is a side view of the example shown in FIG. 4 with a first gate in an open position and a second gate in a closed position.

In the example shown in FIG. 4-9, the pressure vane 100 comprises a flag portion 104 having a large surface area and configured to be blown against by the wind 38b. As wind 38b presses against the flag portion 96, the pressure vane 92 rotates about the shaft 94. This rotation in turn rotates the gate 82 to partially obstruct the opening 80. In one example, as shown in FIG. 9, the opening 80 is significantly blocked and the wind 38b significantly obstructed such that even during times of high wind speed or pressure, the generator 36 will maintain an efficient rotational speed range.

To return the gate 82 to the open position shown in FIG. 4, the vane 2 comprises a spring, actuator, or counterweight 106 configured to bias the gate 82 toward the open position shown in FIG. 4. In this example, the counterweight 106 is fixed to a pole extending from the flag 104, past the shaft 102, to the counterweight 106. Thus, the weight of the counterweight 106 will bias the pole downward, biasing the gate 82 toward the open position. The mass of the counterweight 106 and the distance of the counterweight along the pole from the shaft 102 can be set and adjusted to keep the generator 36 in an efficient rotational speed range.

To accomplish a desired rotation speed and direction, the directional panels 46, 52, 54, and 60, as well as gates 66 and 82 may rotate, slide, or may comprise louvers or other components to control and direct the airflow 38.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept. The invention illustratively disclosed herein suitably may be practiced in the absence of any element which is not specifically disclosed herein.

The invention claimed is:

1. A roof mounted wind energy collection device comprising:
   a support frame configured to be fixed to the roof of a building;
   a wind turbine impeller mounted to the support frame;
   the impeller rotating about an axis of rotation running parallel to an adjacent ridgeline of the roof defining two separate roof surfaces;
   the orientation of the axis of rotation fixed relative to the frame;
   the impeller coupled to a generator configured to convert rotational movement of the impeller to power that can be stored and/or transmitted;
   a first directional panel on a first end of the support frame, the first directional panel configured to direct the wind to at least one impeller vane of the impeller such that the impeller rotates in a first rotational direction about the axis of rotation due to force exerted by the wind blowing in a first direction;
   a second directional panel configured to direct the wind blowing in a second direction opposed to the first direction such that the impeller rotates in the first rotational direction about the axis of rotation;
   a pressure vane comprises a flag portion configured to be blown against by the wind;
   the pressure vane configured to rotate about a pressure vane shaft;
   wherein rotation of the pressure vane rotates a gate to partially obstruct wind from rotating the impeller.

2. The roof mounted wind energy collection device as recited in claim 1 further wherein the second directional panel is configured to reposition to a second position to cooperate with the first directional panel so as to direct the wind blowing in the second direction opposed to the first direction such that the impeller rotates in the first rotational direction about the axis of rotation.

3. The roof mounted wind energy collection device as recited in claim 1 wherein the second directional panel is mounted to the first end of the frame.

4. The roof mounted wind energy collection device as recited in claim 1 further comprising a third directional panel configured to cooperate with the first, and second directional panel so as to direct the wind blowing in a second direction opposed to the first direction such that the impeller rotates in the first rotational direction.

5. The roof mounted wind energy collection device as recited in claim 4 further comprising a fourth directional panel configured to cooperate with the first, second, and third directional panel so as to direct the wind blowing in a second direction opposed to the first direction such that the impeller rotates in the first rotational direction.

6. The roof mounted wind energy collection device as recited in claim 1 wherein the roof comprises a first roof surface at a first angle to the horizon and a second roof surface at a second angle to the first roof surface with a second angle to the horizon, the merging of the first roof surface and second roof surface forming a roof ridge parallel to the axis of rotation of the impeller.

7. The roof mounted wind energy collection device as recited in claim 1 wherein the first directional panel in a second position occludes a flow path through the support frame.

* * * * *